United States Patent [19]
Korekata et al.

[11] Patent Number: 5,509,136
[45] Date of Patent: Apr. 16, 1996

[54] DATA PROCESSING SYSTEM INCLUDING DIFFERENT THROUGHPUT ACCESS SOURCES ACCESSING MAIN STORAGE IN SAME DIRECTION

[75] Inventors: Kenji Korekata, Kawasaki; Nobuo Uchida, Tokyo, both of Japan

[73] Assignee: Fujitsu Limited, Kawasaki, Japan

[21] Appl. No.: 357,147

[22] Filed: Dec. 15, 1994

Related U.S. Application Data

[63] Continuation of Ser. No. 91,891, Jul. 15, 1993, abandoned, which is a continuation of Ser. No. 359,858, May 31, 1989, abandoned.

[30] Foreign Application Priority Data

May 31, 1988 [JP] Japan .................................. 63-133954

[51] Int. Cl.⁶ ...................................... G06F 13/18
[52] U.S. Cl. .................... 395/478; 395/477; 364/DIG. 1; 364/228.1; 364/241.2
[58] Field of Search ............................. 364/200 MS File, 364/900 MS File; 395/425, 474, 477, 478

[56] References Cited

U.S. PATENT DOCUMENTS

| | | | |
|---|---|---|---|
| 3,916,381 | 10/1975 | Malcolm | 395/650 |
| 4,028,664 | 6/1977 | Monahan et al. | 395/275 |
| 4,110,823 | 8/1978 | Cronshaw et al. | 395/425 |
| 4,282,572 | 8/1981 | Moore, III et al. | 395/425 |
| 4,348,725 | 9/1982 | Farrell et al. | 364/300 |
| 4,400,771 | 8/1983 | Suzuki et al. | 395/425 |
| 4,426,681 | 1/1984 | Bacot et al. | 395/425 |
| 4,523,274 | 6/1985 | Fukunaga et al. | 395/325 |
| 4,591,981 | 5/1986 | Kassabov | 395/800 |
| 4,652,993 | 3/1987 | Scheuneman et al. | 395/425 |
| 4,847,757 | 7/1989 | Smith | 395/325 |
| 4,888,691 | 12/1989 | George et al. | 364/300 |
| 4,916,609 | 4/1990 | Hoshino et al. | 395/425 |
| 5,034,887 | 7/1991 | Yasui et al. | 395/800 |
| 5,073,871 | 12/1991 | Uchida et al. | 395/425 |
| 5,303,389 | 4/1994 | Hoshino et al. | 395/425 |

FOREIGN PATENT DOCUMENTS 0215621  3/1987  European Pat. Off. .

OTHER PUBLICATIONS

M. Morris Mano, Second Edition, Computer System Architecture, 1982, pp. 414–454.

Murray Sargent III et al., The IBM Personal Computer From the Inside Out, Revised Edition, 1986, 1984, pp. 158–159, pp. 240–243.

*Primary Examiner*—Matthew M. Kim
*Attorney, Agent, or Firm*—Staas & Halsey

[57] ABSTRACT

A data processing system including a small throughput access source and a large throughput access source therein for accessing a main storage unit in a consecutive block access mode. The system further includes a detecting unit and a selecting unit. The detecting unit detects an access conflict expected to occur at the same address of the main storage unit. The selecting unit responds to the detection by the detecting unit and momentarily stops the access by the small throughput access source to give priority to the large throughput access source for accessing the conflicting address of the main storage unit.

31 Claims, 14 Drawing Sheets

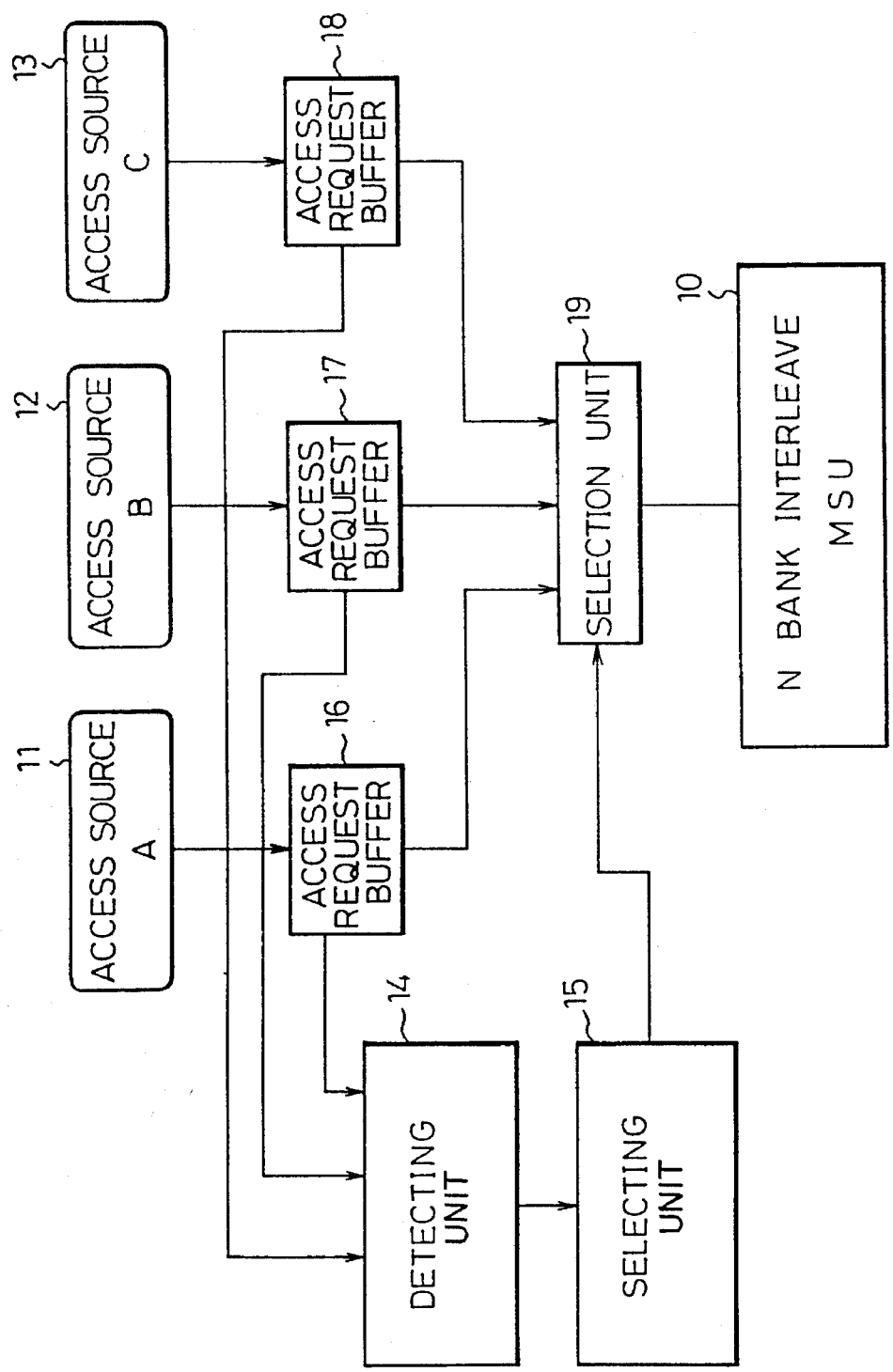

DATA PROCESSING SYSTEM INCLUDING DIFFERENT THROUGHPUT ACCESS SOURCES ACCESSING MAIN STORAGE IN SAME DIRECTION

This application is a continuation, of application Ser. No. 08/091,891, filed Jul. 15, 1993, now abandoned, which is a division, of application Ser. No. 07/359,858, filed May 31, 1989, now abandoned.

BACKGROUND OF THE INVENTION

1. Field of the Invention

The present invention relates to a data processing system including different throughput access sources, and more particularly to a control means, introduced in the system, for carrying out an access from a plurality of access sources having different throughputs to a main storage unit in a consecutive block access mode.

Recently, along with an increase in scale of data handled in an information processing system, a scale of an access to the main storage unit in the system has also become large. In addition, there is a recent tendency for the main storage unit to be accessed by a variety of access sources, such as a vector processing unit, an extended storage unit and the like, other than usual access sources, such as a scalar processing unit, an input/output (I/O) processor, and the like. Under the circumstance mentioned above, a need has arisen for accessing the main storage unit by accessing addresses which specify each consecutive long addresses thereof. In relation to the consecutive long addresses, which are hereinafter is referred to by the term "consecutive block access" which means that each memory area specified by consecutive addresses is divided into a plurality of blocks and the thus divided blocks are accessed sequentially. A typical usual working throughput therefor is hereinafter referred to as a "throughput of consecutive block access".

In the above-mentioned data processing system including different throughput access sources, when a certain access source having a large throughput starts accessing the main storage unit in the consecutive block access mode while another access source having a small throughput has already started accessing the main storage unit in the consecutive block access mode, there is a high probability that a conflict in access will occur between both access of the sources at the same addresses of the main storage unit.

In the case of such conflict, the access source having the large, throughput has to wait until the access to the main storage unit is completed by the other access source having the small throughput, since, in the exemplified case, the former access source having the large throughput starts the access after the access carried out by the latter access source having the small throughput. This apparently reduces the total throughput of the related data processing system, and accordingly, it has long been hoped to improve the data processing efficiency.

2. Description of the Related Art

In the prior art, one proposal for improving data processing efficiency has been disclosed in a European Patent Application (Applicant FUJITSU LIMITED) with a publication number 0,215,621 (A2) published on Mar. 25, 1987. According to the prior art, as depicted in FIG. 3 of the publication, the consecutive block accesses are performed intermittently so as to create nonaccess periods along the line of the consecutive block accesses. Thus, continual consecutive block accesses can cross the intermittent consecutive block accesses without conflict by passing through the aforesaid nonaccess period. The prior art, however, has a disadvantage that the aforesaid intermittent consecutive block accesses per se exhibit relatively low efficiency throughput.

SUMMARY OF THE INVENTION

Accordingly, an object of the present invention is to provide a data processing system including different throughput access sources, which system exhibits high efficiency throughput by not reducing the throughput of the access source having large throughput even if a conflict occurs with another access source having a small throughput.

To attain the above object, a conflict expected to occur is detected first, which conflict is one occurring between a small throughput access source and a large throughput access source. Then, every time the aforesaid conflict is detected, the consecutive block access by the small throughput access source is momentarily stopped so as to prevent the conflict from occurring, so that the consecutive block access by the large throughput access source can be continued without any interruption. Thus, the large throughput can be maintained. In this case, the aforesaid momentary stoppage time of the small throughput access source is negligible compared to the delay time which would occur in the prior art to the large throughput access source due to an interruption by the small throughput access source when the conflict occurs.

BRIEF DESCRIPTION OF THE DRAWINGS

The above object and features of the present invention will be more apparent from the following description of the preferred embodiments with reference to the accompanying drawings, wherein:

FIG. 3 is a principle block diagram of a data processing system according to the present invention;

DESCRIPTION OF THE PREFERRED EMBODIMENTS

Before describing the embodiments of the present invention, the conventional art and the disadvantages therein will be described with reference to the related figures.

Figure 1:
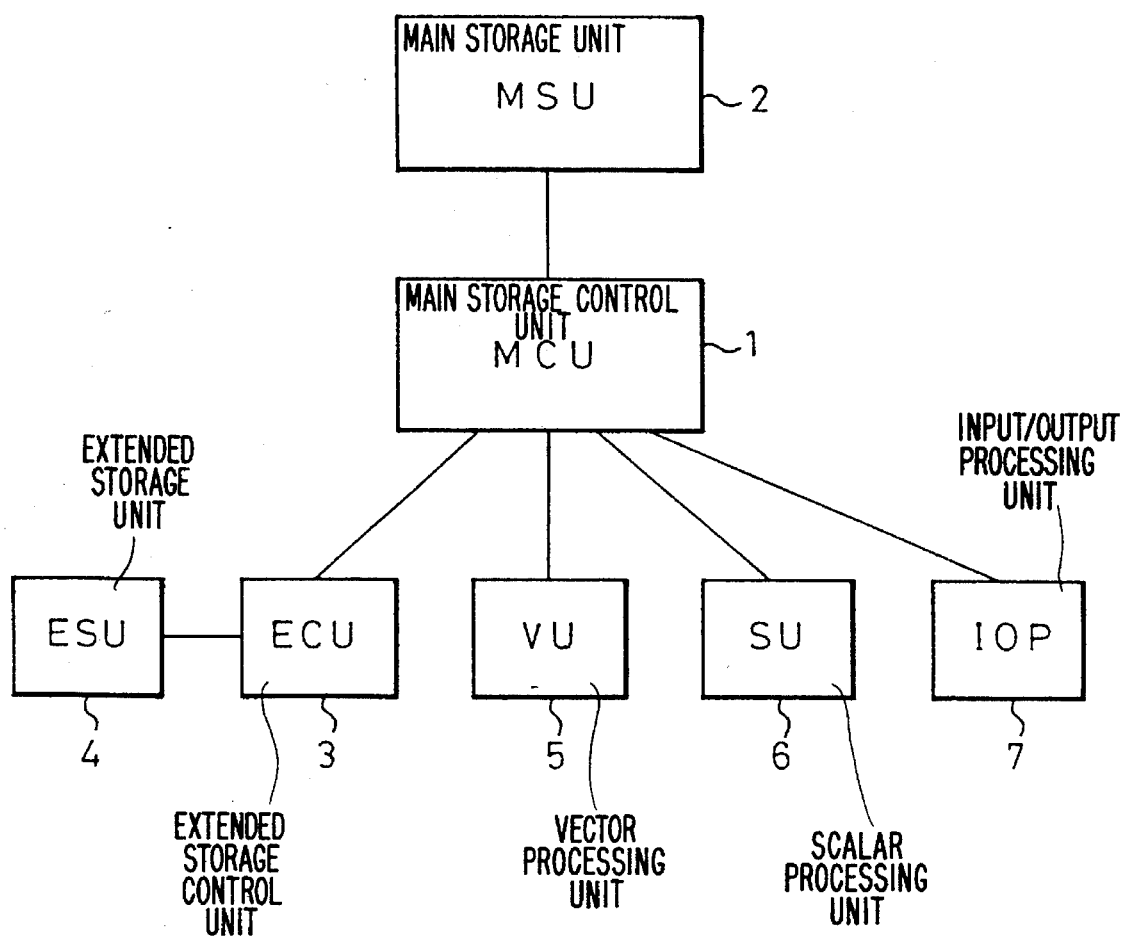
FIG. 1 is a general block diagram of a data processing system to which the present invention is applied.

FIG. 1 is a general view of a data processing system to which the present invention is applied. In FIG. 1, reference numeral 1 represents a main storage control unit (MCU) which controls a main storage unit (MSU) to which the present invention is mainly adopted. To be specific, the main storage control unit (MCU) 1 controls traffic of access requests issued from a variety of access sources, e.g., an extended storage control unit (ECU) 3, a vector processing unit (VU) 5, a scalar processing unit or units (SU) 6, an input/output processor (I/O) 7, and the like. The extended storage control unit (ECU) 3 controls the access to or from an extended storage unit (ESU) 4.

The main storage unit (MSU) 2 usually assumes a structure of N (N≧2) bank interleave. That is, (1) different banks can be accessed simultaneously by two or more access sources, and (2) the same bank can be accessed simultaneously only by one access source, and therefore another access source must wait for a while if it requires the bank, which is a characteristic of the N bank interleave. Further, the aforesaid consecutive block access relies greatly on the N bank interleave, and the aforesaid consecutive block access throughput also relies greatly thereon. Here, a problem arises in that there is a high probability of conflict between a consecutive block access generated by the access source of a large throughput, e.g., the vector processing unit (VU) 5, and a consecutive block access generated by the access source of a small throughput, e.g., the extended storage control unit (ECU) 3 in cooperation with the extended storage unit (ESU) 4. This will be clarified below with reference to the figures.

Figure 2A:
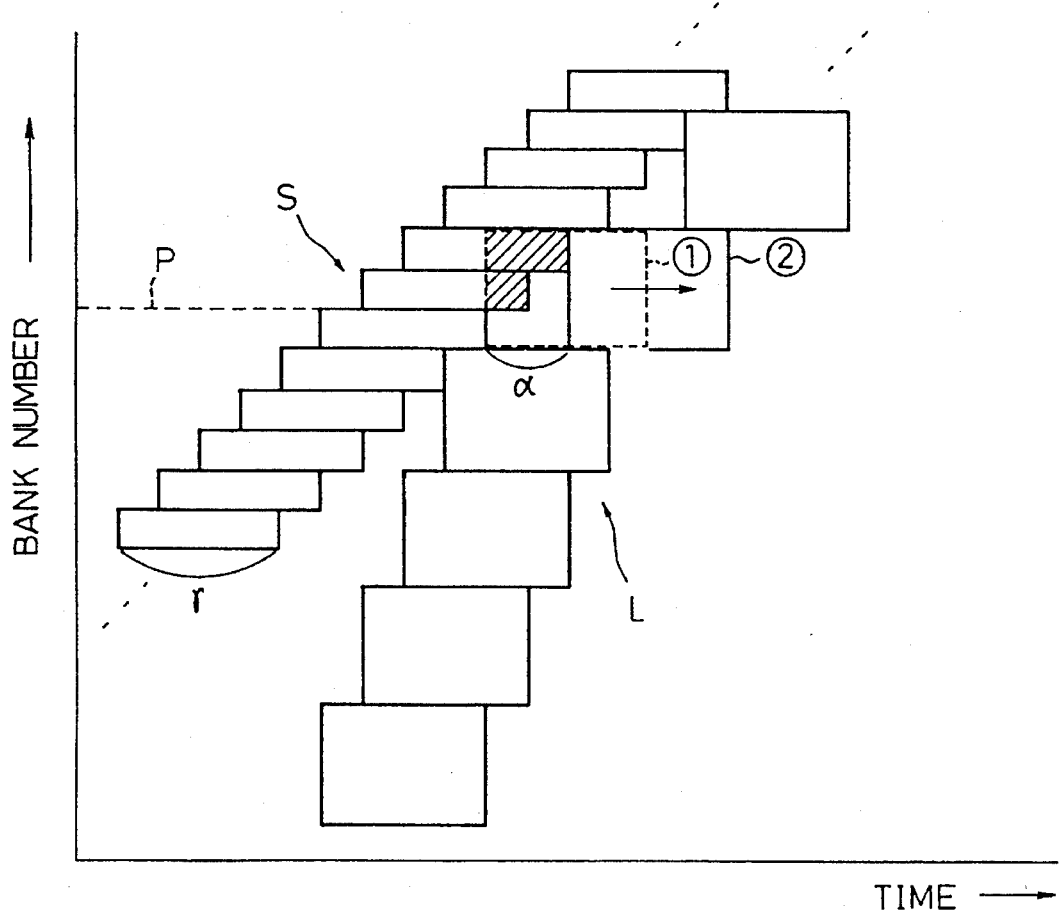
FIGS. 2A and 2B depict access patterns for explaining a conflict between a large throughput block access and a small throughput block access.
Figure 2B:
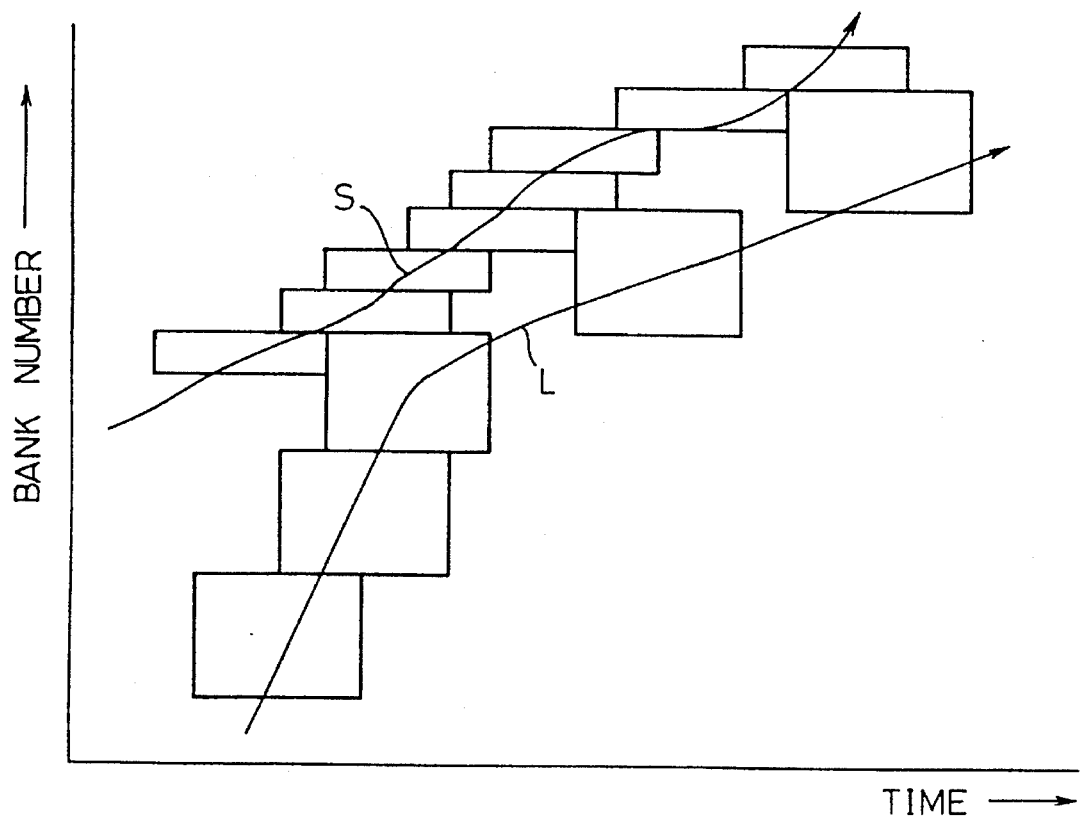

FIGS. 2A and 2B depict access patterns for explaining a conflict between a large throughput block access and a small throughput block access. In each of FIGS. 2A and 2B, the abscissa represents time while the ordinate represents an address, i.e., a bank number. FIG. 2A depicts an access pattern S (left upper stream) of a small throughput consecutive block access and an access pattern L (right lower stream) of a large throughput consecutive block access, where both consecutive block accesses S and L are carried out with high density. FIG. 2B depicts similar access patterns S and L to that of FIG. 2A, but both consecutive block accesses S and L are carried out with low density.

In FIG. 2A, the access patterns show that, during the access to the main storage unit by the access source having the small throughput (refer to "S"), access to the main storage unit is simultaneously made by the access source having the large throughput, and when the block access S to the address following the block number P is carried out, the block access L is also carried out to the same block number. In the above situation, a conflict occurs at the block numbers following the block number P, which areas are schematically illustrated in FIG. 2A with hatchings.

In order to prevent the conflict from occurring, the access source of the access pattern L has to delay the start of the conflicting block address by a term α with respect to a flow of the current block access of the small throughput S. Incidentally, reference character γ denotes a bank busy period, i.e., a term necessary for accessing each block.

In FIG. 2B, even though the large throughput consecutive block access L is performed intermittently, the access L is to follow the small throughput consecutive block access S. Thus, the large throughput consecutive block access L can no longer get ahead of the small throughput consecutive block access S.

As mentioned above, according to the conventional art, the consecutive block access generated by the access source having the large throughput cannot get ahead of the consecutive block access generated by the access source having the small throughput when a conflict occurs therebetween. Therefore a problem occurs in that the large throughput consecutive block access is reduced to an ability lower than its inherent high ability.

In a typical and conventional data processing system, a long consecutive block access is not needed to frequently, and therefore, the above-mentioned problem does not matter. This is why a measure for overcoming the problem has not been previously discussed. However, in future systems, such long consecutive block accesses will be needed frequently due to, for example, an employment of the vector processing unit (VU) together with the extended storage unit (ESU).

FIG. 3 illustrates a principle block diagram of a data processing system according to the present invention. In FIG. 3, reference numeral 11 represents an access source (A) having a large throughput, and 12 and 13 represent access sources (B, C) having small throughputs. These access sources 11, 12 and 13 correspond to the access sources 3 through 7 shown in FIG. 1. Reference numeral 10 represents an N bank interleave main storage unit (MSU) which corresponds to the main storage unit (MSU) 2 shown in FIG. 1. The remaining part in FIG. 3 corresponds to the main storage control unit (MCU) 1 shown in FIG. 1, to which the present invention is mainly adopted.

In general, according to the principle of the present invention, the aforesaid remaining part is comprised of a detecting unit 14 for detecting a conflict between one consecutive block access requested by the access source 12 or 13 having the small throughput and the other consecutive block access requested by the access source 11 having the large throughput and a selecting unit 15 for stopping, when the conflict is detected by the detecting unit 14, an access request issued from the access source 12 or 13 having the small throughput, whereby the selecting unit 15 gives priority for accessing the main storage unit 10 to the access source 11 having the large throughput.

To be specific, in FIG. 3, the detecting unit 14 and the selecting unit 15 work with the aid of usual members, i.e., access request buffers 16, 17, and 18, and a selection unit 19. The detecting unit 14 discriminates whether the conflict will occur or not by monitoring the access requests stored in the access request buffers 16, 17, and 18. If the detecting unit 14 discriminates that the conflict will occur, the selecting unit 15 commands the selection unit 19 to stop the access request, issued from the small throughput access sources 12 or 13, passing therethrough to the main storage unit 10, while the selecting unit 15 commands the selection unit 19 to give priority to the access request, issued from the large throughput access source 11, for accessing the main storage unit 20.

Figure 4:
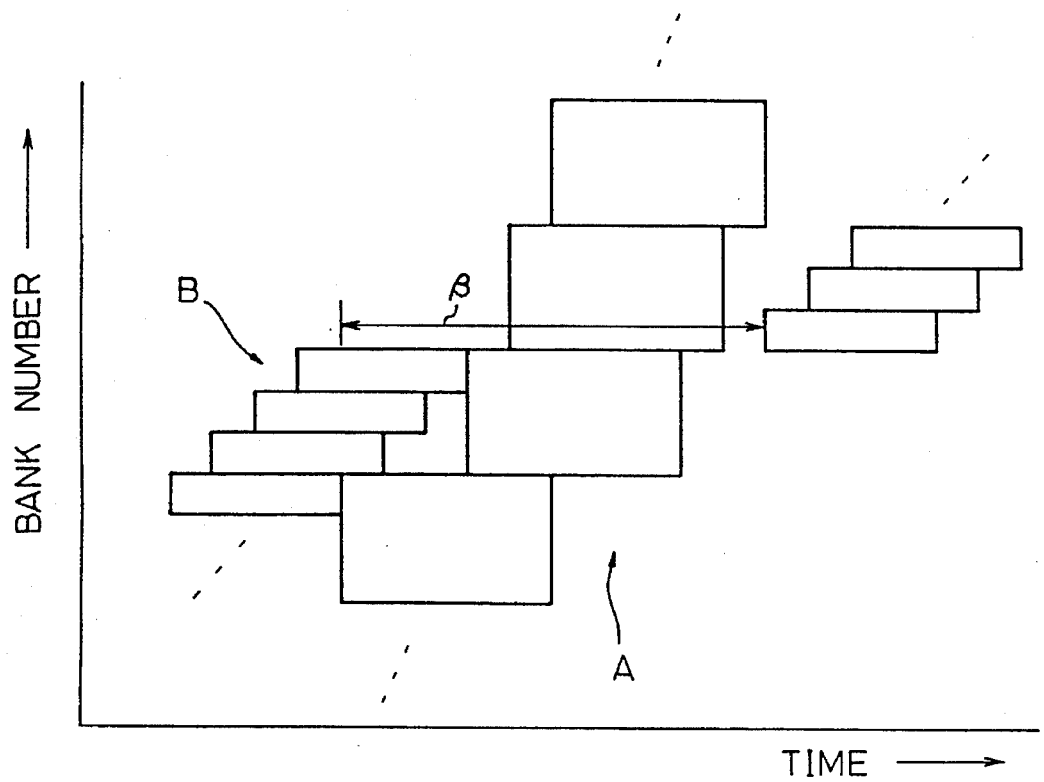
FIG. 4 depicts an access pattern for explaining the operation achieved in the system of FIG. 3.

FIG. 4 depicts an access pattern for explaining the operation achieved in the system of FIG. 3, which corresponds to the access patterns explained with reference to the previous FIGS. 2A and 2B. Referring to both FIGS. 4 and 3, the access requests issued from the access sources 11, 12, and 13 are momentarily stored in respective access request buffers 16, 17, and 18. These access requests are, on the one hand, monitored by the detecting unit 14, and on the other hand, applied to the selection unit 19. The monitoring is performed to determine whether conflict will occur.

If the conflict occurs between, for example, the consecutive block access generated by the access source (B) 12 of the throughput and the consecutive block access generated by the access source (A) 11 of the large throughput, the related conflict detection output is supplied to the selecting unit 15.

The selecting unit 15 further analyzes the aforesaid conflict detection output, and if it confines that the conflict will actually occur at the same bank number, it stops the access request generated by the access source (B) 12, while it allows the access request generated by the access source (A) 11 to pass through the selection unit 19 via a line L1. Thereby, the access source (A) 11 can access the main storage unit (MSU) 10.

When the access source (A) 11 of the large throughput finishes the access for the conflicting block, the conflict state with the access source (B) 12 is removed. Therefore, the access source (B) 12 can restart the block access to the MSU 10. That is, in FIG. 4, the consecutive block access by the source (B) 12 is restarted after a suitable waiting period represented by the character β. Thereafter, the access source (B) 12 can continue its block access as before without any interruption. On the other hand, the access source (A) 11 can maintain its block access from beginning to end with its maximum access ability. It should be understood that the address used for the aforesaid detection of the conflict is expressed in terms of the bank number and the actual conflict is detected as a case where the access sources 11 and 12 specify the same bank.

Figure 5:
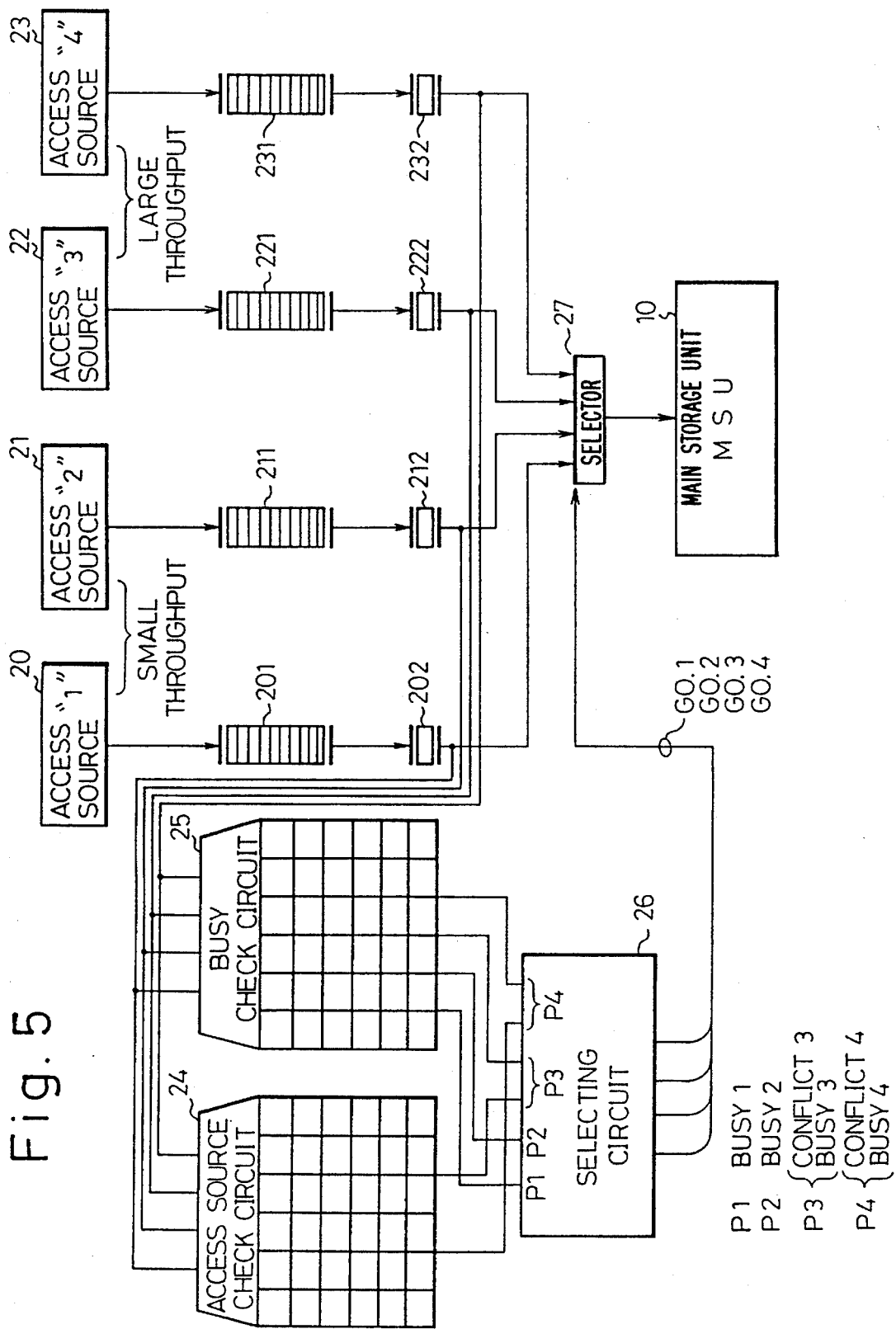
FIG. 5 is a block diagram illustrating a data processing system according to a first embodiment of the present invention.

FIG. 5 illustrates a data processing system according to a first embodiment of the present invention. In the first embodiment, the aforesaid access source having the small throughput is exemplified by two access sources ("1" and "2") 20 and 21. Similarly, the aforesaid access source having the large throughput is exemplified by two access sources ("3" and "4") 22 and 23. Reference numerals 24 represents an access source check circuit, 25 represents a busy check circuit, 26 represents a selecting circuit, and 27 represents a selection gate. Reference numerals 201, 211, 221, and 231 represent queue buffers which momentarily store therein respective access requests issued from the access sources ("1" through "4") 20 through 23. The access requests are supplied to the selection gate 27 via respective access ports 202, 212, 222 and 232.

In general, according to the first embodiment, the aforesaid detecting unit 14 is comprised of the busy check circuit 25 and the access source check circuit 24.

The busy check circuit 25 is operative to check a busy state for each bank in the main storage unit (MSU) 10, and the access source check circuit 24 is operative to store therein identification information allotted to each access source ("1", "2") 20 and 21 having the small throughput, which identification information is checked every time each access source ("3", "4") 22 or 23 having the large throughput issues an access request. Thus, the selecting unit, i.e., the selecting circuit 26, is operated according to both the output from the access source check circuit 24 and the output from the busy check circuit 25.

The busy check circuit 25 and the access source check circuit 24 receive signals given from the access ports 202, 212, 222 and 232. Each of these signals from the access ports contain at least bank address information and the identification information. Thus, the busy check circuit 25 and the access source check circuit 24 produce a busy signal, if any, and a conflict signal, if any, respectively, which busy and conflict signals are supplied to the selecting unit, i.e., the selecting circuit 26.

Figure 6:
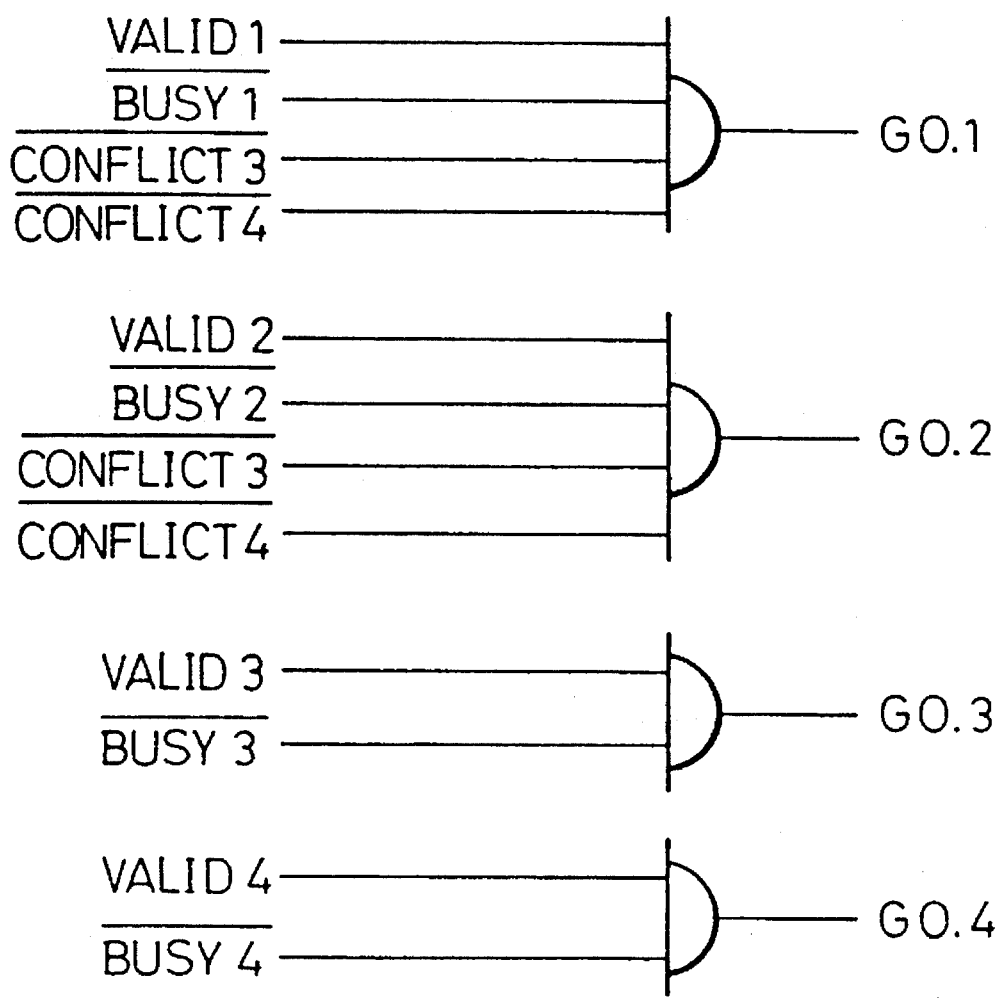
FIG. 6 a circuit diagram of an example of the selecting circuit shown in FIG. 5.

FIG. 6 is a circuit diagram of an example of the selecting circuit shown in FIG. 5. In general, according to the example, the selecting circuit 26 in FIG. 5 is comprised of logic gates (AND gates) corresponding to the access sources ("1" through "4"), respectively. Each logic gate corresponding to each access source ("3", "4") having the large throughput receives at least a corresponding busy signal (BUSY 3, BUSY 4) and produces a GO signal (GO. 3, GO. 4) for starting access to the main storage unit 10, if the busy signal (BUSY 3, BUSY 4) indicates that no busy state exists ($\overline{\text{BUSY 3}}$, $\overline{\text{BUSY 4}}$).

Each logic gate corresponding to each access source ("1", "2") having the small throughput receives at least a corresponding busy signal (BUSY 1, BUSY 2) and the conflict signal (CONFLICT 3, CONFLICT 4), and produces a GO signal (GO. 1, GO. 2) for starting access to the main storage unit 10, if the busy signal indicates that no busy state exists ($\overline{\text{BUSY 1}}$, $\overline{\text{BUSY 2}}$) and the conflict signal indicates that no conflict state with the access source ("3", "4") having the large throughput exists ($\overline{\text{CONFLICT 3}}$, $\overline{\text{CONFLICT 4}}$) However, if the busy state and/or the conflict state are found by the use of aforesaid busy and conflict signals, the related GO signal (GO. 1, GO. 2) is stopped.

Incidentally, signals represented by VALID 1, VALID 2, VALID 3 and VALID 4 are not essential to the present invention, but commonly used in the system for indicating a validity given, as a priority, to one of the access sources if identical access requests are issued, at the same time, for accessing the same bank.

Regarding the logic gates shown in FIG. 6, as the selecting circuit 26, it is further necessary to stop the GO signal (GO. 1 or GO. 2) for a predetermined time, in order to restart the consecutive block access, after removing the related conflict. Hardware for realizing the above will be explained below.

Figure 7:
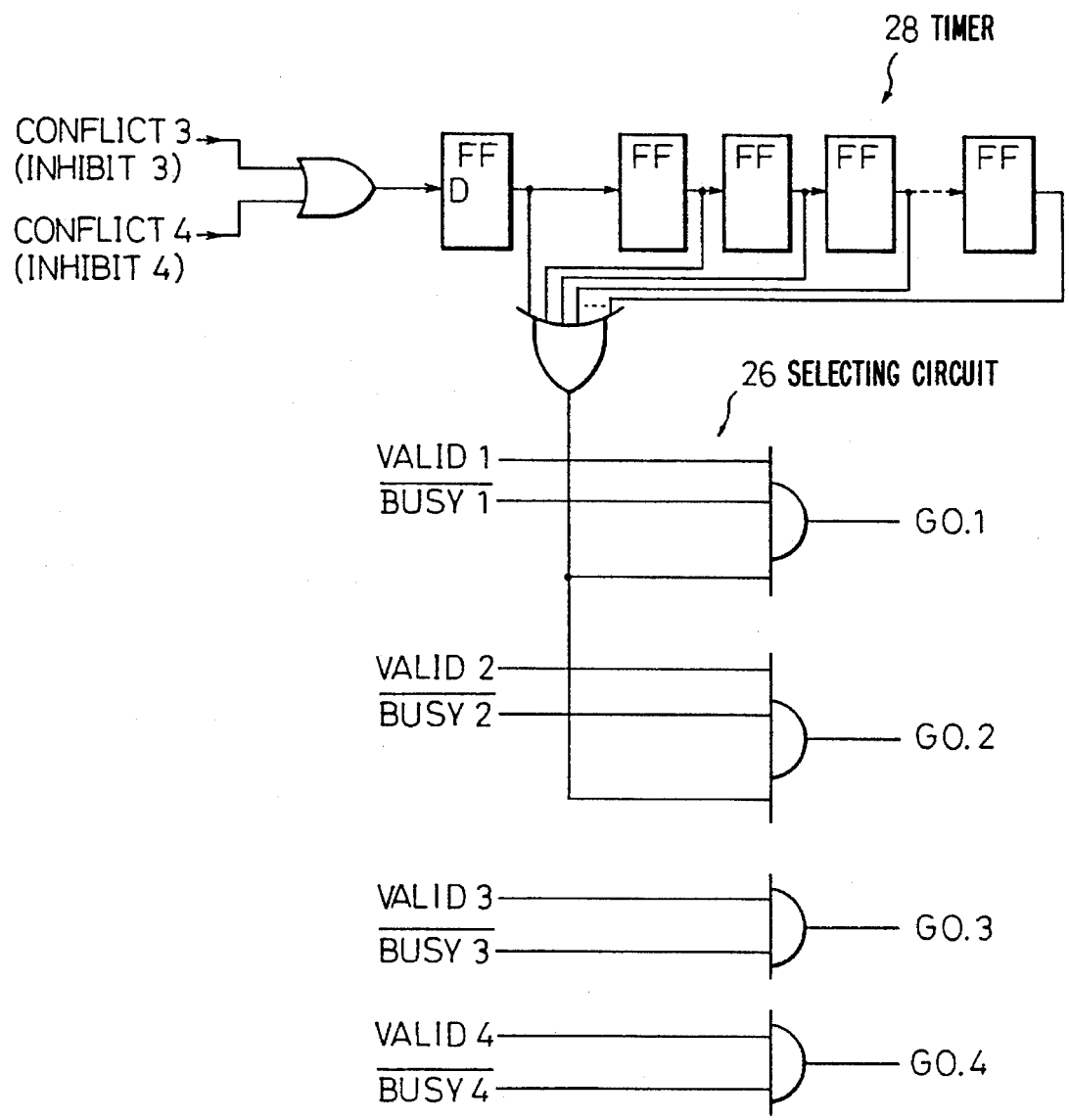
FIG. 7 is a circuit diagram of another example of the selecting circuit shown in FIG. 5.

FIG. 7 is a circuit diagram of another example of the selecting circuit shown in FIG. 5. In FIG. 7, each of the logic gates (AND gates) corresponding to the access source ("1", "2") having the small throughput are provided with a timer means 28 which is operative to stop issuing the GO signals (GO. 1, GO. 2) for a predetermined time (β) after reception of the conflict signal (CONFLICT 3, CONFLICT 4) so that the related conflict state is removed after the predetermined time. Thereafter, the waiting access source ("1", "2"), can restart its own consecutive block access. The timer means 28 is specifically realized in the form of a shift register comprised of a plurality flip flops (FF's) connected in tandem. A first stage flip flop FF is set by the signal CONFLICT 3 or CONFLICT 4 via an OR gate, as illustrated.

Returning to FIG. 5, the busy check circuit 25 is comprised of first holding circuits allotted for respective banks in the main storage unit 10, and when a certain GO signal (GO. 1 through GO. 4), for starting access to the main storage unit 10, is issued from the selecting circuit 26, the corresponding flip flop is set. For example, if GO.1 signal is issued, the corresponding flip flop, specified by the address in the access port 202, is set, for a predetermined time after the issuance of the GO signal (GO. 1), which time (γ) is long enough for completing the related access to the main storage unit 10.

Further, the access source check circuit 24 is comprised of second holding circuits allotted for respective banks in the main storage unit 10, and when a certain GO signal (GO. 1, GO. 2), for starting access to the main storage unit 10, is issued from the selecting circuit 26 in response to the access request from the access source ("1", "2") having the small throughput, the related identification information is held in the corresponding holding circuit for a predetermined time after the issuance of the GO signal (GO. 1, GO. 2), which time ($\gamma$) is enough for completing the related access to the main storage unit 10.

Figure 8:
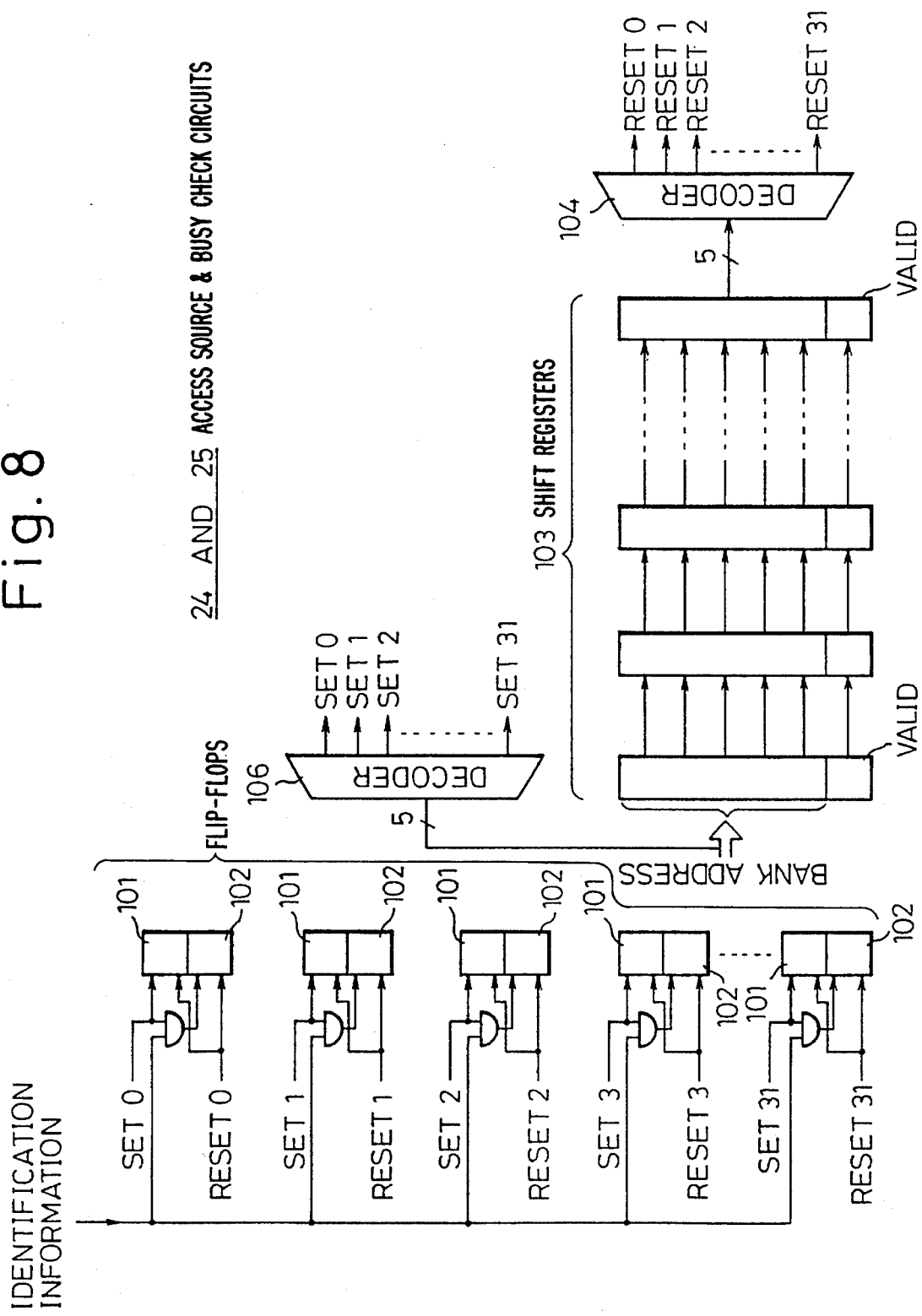
FIG. 8 is a circuit diagram illustrating an example of first and second holding means.

FIG. 8 illustrates an example of first and second holding units. The first and second holding units can be formed separately, but in the example, both the first and second holding units are formed as one body for simplicity. The first holding units, comprising the busy check circuit 25, is realized by a plurality of flip flops 101. The second holding unit, comprising the access source check circuit 24, is also realized by a plurality of flip flops 102. The first and second holding units further include commonly a shift register 103 and a decoder 104. The shift register 103 and the decoder 104 are used as a delay unit for creating the term $\gamma$ shown in FIG. 2A.

It should be understood that, in the example, the main storage unit 10 is set up with four main storage areas. Each of the four main storage areas is composed of four modules. Each of the four modules is composed of thirty two banks. Therefore, these are 512 (4×4 ×32) banks in all. In the example of FIG. 8, only the first and second holding units, belonging to one of the 16 (4×4) modules, are illustrated for brevity.

When the aforesaid bank address information is given from the access ports (202, 212, 222, 232), the corresponding one of the flip flops 101 is set by the output of a decoder 106 (SET 0 through SET 31). At the same time, if the bank address information is generated from the access source ("1", "2") having the small throughput, the aforesaid identification information for discriminating the small throughput access source ("1" or "2") is also stored in the corresponding flip flop 102.

At the same time, the aforesaid bank address information is supplied to the shift register 103 together with a valid bit (VALID 1 through VALID 4). After a delay of the predetermined time, the bank address information is supplied to the decoder 104. Thus the decoder 104 produces a corresponding one of the reset signals (RESET 0 through RESET 31), so that the previously set flip flops 101,102 are reset in order to accept a new bank address which will be given next.

Figure 9:
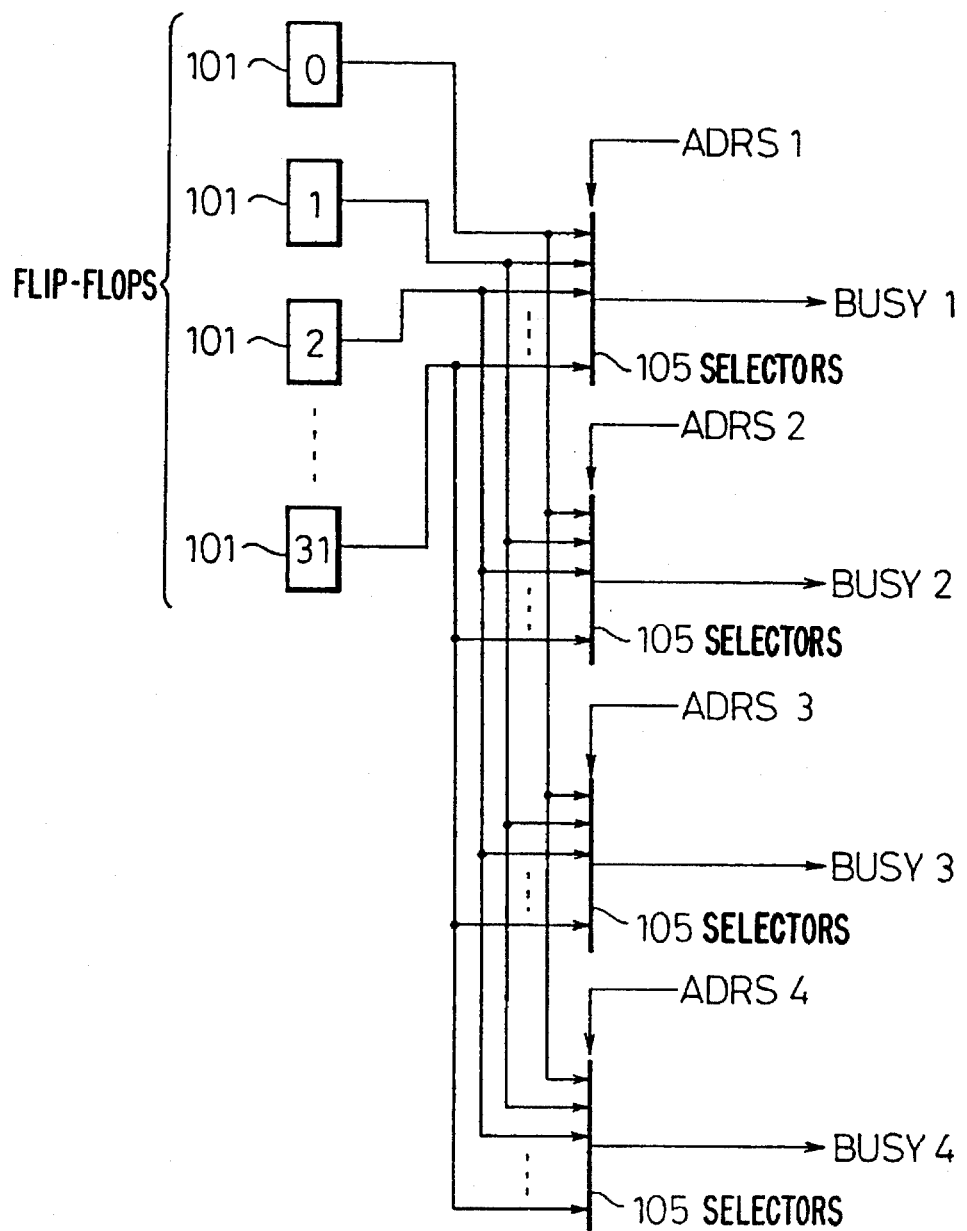
FIG. 9 is a circuit diagram illustrating an example of an output stage of the busy check circuit.

The busy check circuit 25 finally produces the aforesaid busy signals (BUSY 1 through BUSY 4) by the use of the aforesaid flip flops 101. FIG. 9 illustrates an example of an output stage of the busy check circuit. Reference characters BUSY 1 through BUSY 4 were already shown in FIG. 6. The output from the flip flops 101 (FIG. 8) are commonly applied to selection gates 105. When the access request is output from any one of the access ports (see 202, 212, 222, 232 in FIG. 5), the corresponding one of the selection gates 105 is opened to pass the busy signal therethrough (BUSY) if the busy state exists. In FIG. 9, reference characters ADRS 1 through ADRS 4 represent addresses sent from the access ports 202, 212, 222, 232, respectively, to select the corresponding holding circuit (flip flop 101).

It is easily understood by a person skilled in the art that the output stage of the access source check circuit 24 can similarly be realized by the use of the circuit shown in FIG. 9 to produce the conflict signal (CONFLICT 3, CONFLICT 4). In this case, the flip flops 101 should be replaced by the flip flops 102. However, two selection gates among the four selection gates 105 of FIG. 9 is enough to produce the two conflict signals CONFLICT 3 and CONFLICT 4. Accordingly, two addresses ADRS 3 and ADRS 4 are needed therefor.

Figure 10:
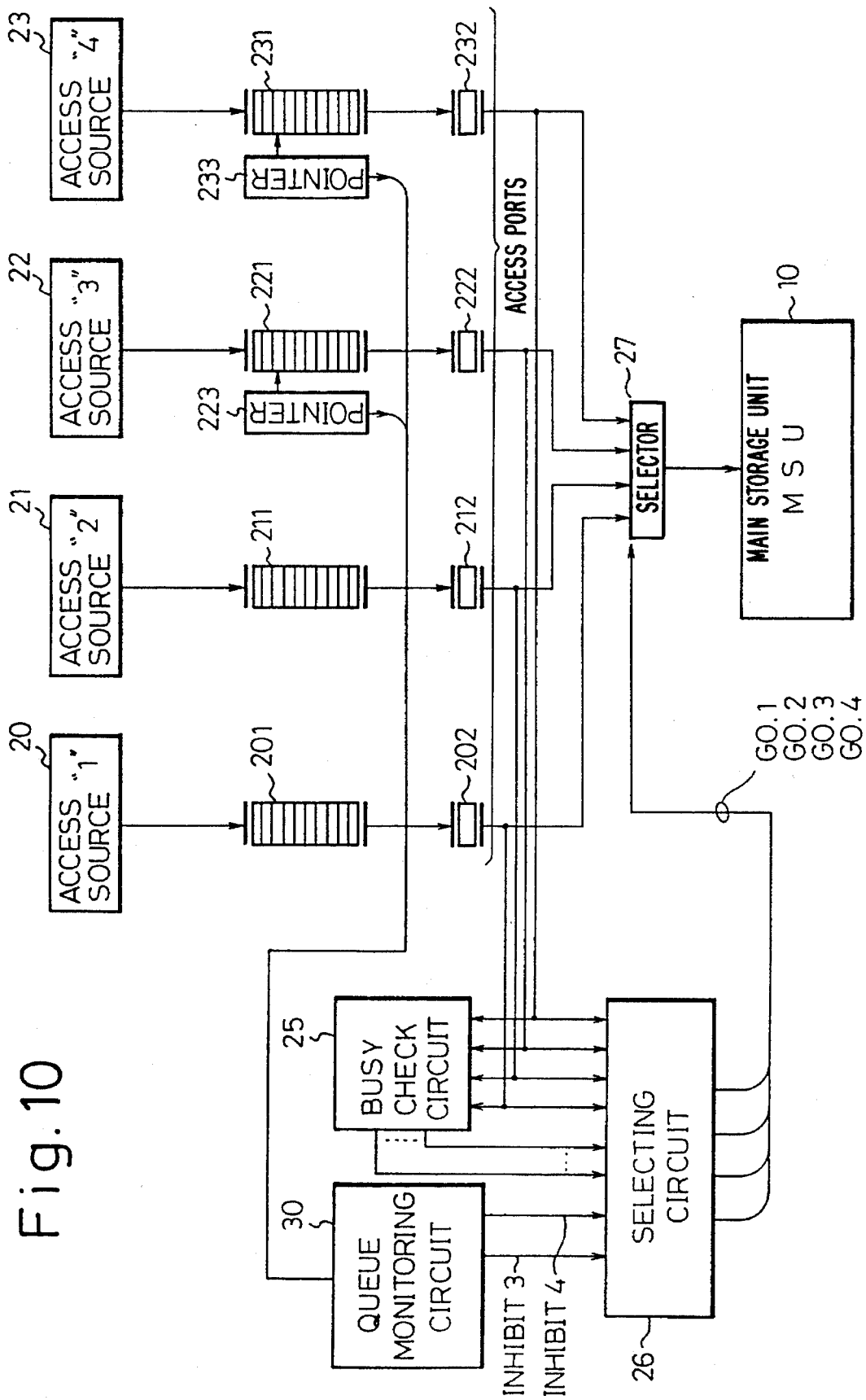
FIG. 10 is a block diagram illustrating a data processing system according to a second embodiment of the present invention.

FIG. 10 illustrates a data processing system according to a second embodiment of the present invention. It should be noted that members identical to those explained before are indicated by the same reference numerals and characters (this also applies to later figures). In general, according to the second embodiment, the aforesaid detecting means 14 is comprised of the busy check circuit 25 and a queue pointer monitoring circuit 30.

The point of the second embodiment is that the aforesaid conflict state can be found by watching a number of access requests accumulated in the queue buffers 221, 231 issued from the large throughput access sources "3", "4". The queue buffers are usually comprised of First In First Out (FIFO) memories. If the conflict between one consecutive block access and another consecutive block access takes place, it is very likely that the number of the access requests accumulated in the queue buffers 221, 231 will abnormally increase, since the throughput of the access sources "3" and "4" reduces due to the conflict.

The busy check circuit 25 is operative to check a busy state for each bank in the main storage unit 10, as mentioned previously.

The queue pointer monitoring circuit 30 is operative to monitor each usual queue pointer (223, 233) which cooperates with each queue buffer (221, 231) for, as mentioned previously, momentarily storing therein the access request issued from the corresponding access source ("3", "4") having the large throughput, and then operative to output an inhibit signal (INHIBIT 3, INHIBIT 4) when it monitors that the amount of the access requests accumulated in the queue buffer (221, 231), reaches a predetermined upper level.

Thus the selecting unit 15 (FIG. 3), i.e., the selecting circuit 26, is operated according to both the output from the queue pointer monitoring circuit 30 and the output from the busy check circuit 25. It should be understood here that queue pointers similar to the queue pointers 223, 233 are also provided with each of the queue buffers 201 and 211, but are not shown in FIG. 10, since these queue pointers are not used with the present invention.

As in the first embodiment (FIG. 5), the busy check circuit 25 receives signals given from the access ports 202, 212, 222, and 232, and each of these signals from the access ports contain at least bank address information and identification information allotted to each said access source.

Thus the busy check circuit 25 and the queue pointer monitoring circuit 30 produce the busy signal, if any, and the inhibit signal, if any, respectively, which busy and inhibit signals are supplied to the selecting means, i.e., the selecting circuit 26.

Figure 11:
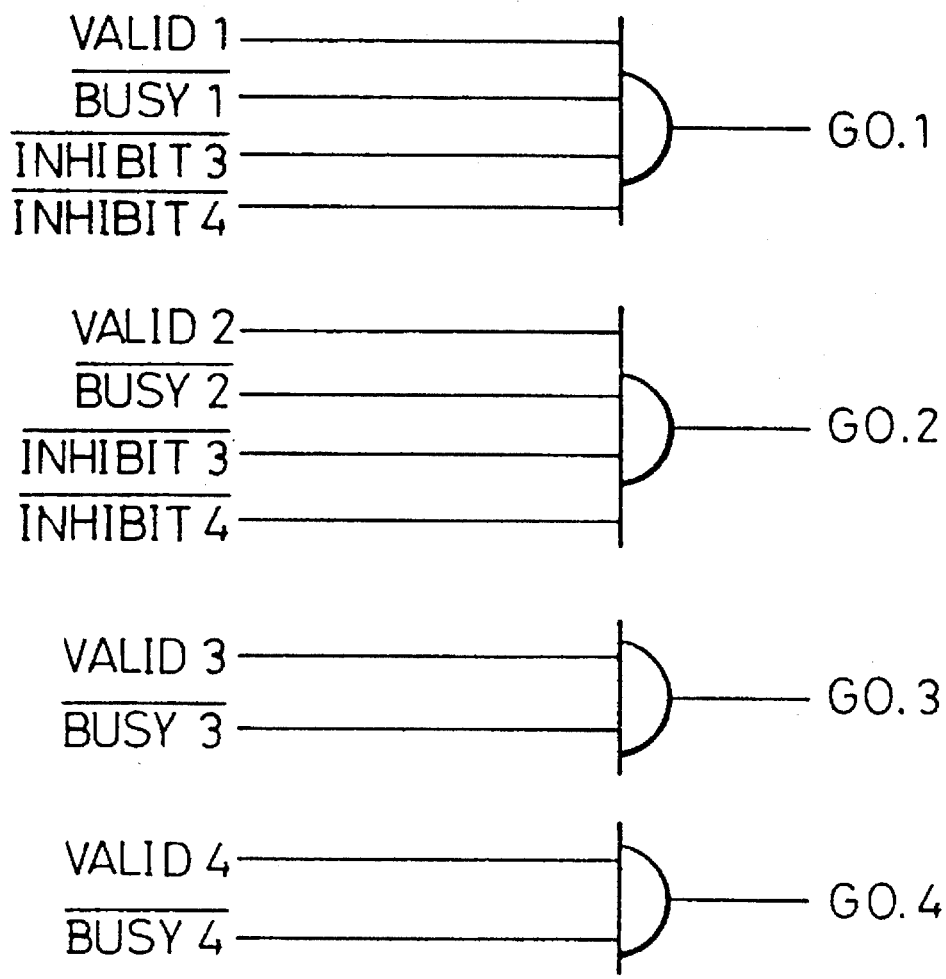
FIG. 11 is a circuit diagram of an example of the selecting circuit shown in FIG. 10.

FIG. 11 is a circuit diagram of an example of the selecting circuit 26 shown in FIG. 10. The construction of the selecting circuit 26 is the same as that shown in FIG. 6. The difference between the selecting circuits 26 of FIG. 6 and FIG. 11 is that the circuit 26 of FIG. 11 receives as an input the signals INHIBIT 3 and INHIBIT 4, instead of CONFLICT 3 and CONFLICT 4 as in FIG. 6.

As shown in FIG. 11 each logic gate corresponding to each said access source ("1", "2") having the small throughput receives at least a corresponding busy signal (BUSY 1, BUSY 2) and the inhibit signal (INHIBIT 3, INHIBIT 4) and produces the aforesaid GO signal (GO. 1, GO. 2) for starting access to the main storage unit 10, if the busy signal indicates that no said busy state exists ($\overline{BUSY\,1}$, $\overline{BUSY\,2}$) and the inhibit signal indicates that no conflict state with the access source ("3", "4") having large throughput exists ($\overline{INHIBIT\,3}$, $\overline{INHIBIT\,4}$). However, if the busy state and/or the conflict state (inhibit state) are found by the use of the aforesaid busy and inhibit signals, the related GO signal is stopped. The meaning of the reference "VALID" has already been explained.

Regarding the logic gates shown in FIG. 11, for the selecting circuit 26, as mentioned previously in reference to the first embodiment, it is further necessary to stop the GO signal (GO. 1 or GO. 2) for a predetermined term, in order to restart the consecutive block access, after removing the related conflict. Hardware for realizing the above is the same as that shown in FIG. 7. In FIG. 7, the signals INHIBIT 3, INHIBIT 4 in parentheses should be used for the second embodiment, instead of the signals CONFLICT 3, CONFLICT 4.

The busy check circuit 25 is comprised of holding circuits (refer to flip flops 101 in FIG. 8) allotted for respective banks in the main storage unit 10, and when a certain GO signal, GO. 1 through GO. 4 for starting access to the main storage unit 10, is issued from the selecting circuit 26, the corresponding flip flop is set. For example, if GO. 1 signal is issued, the corresponding flip flop, specified by the address in the access port 202, is set, for a predetermined time after the issuance of the GO signal (GO. 1), which time is long enough for completing the related access to the main storage unit 10.

Figure 12:
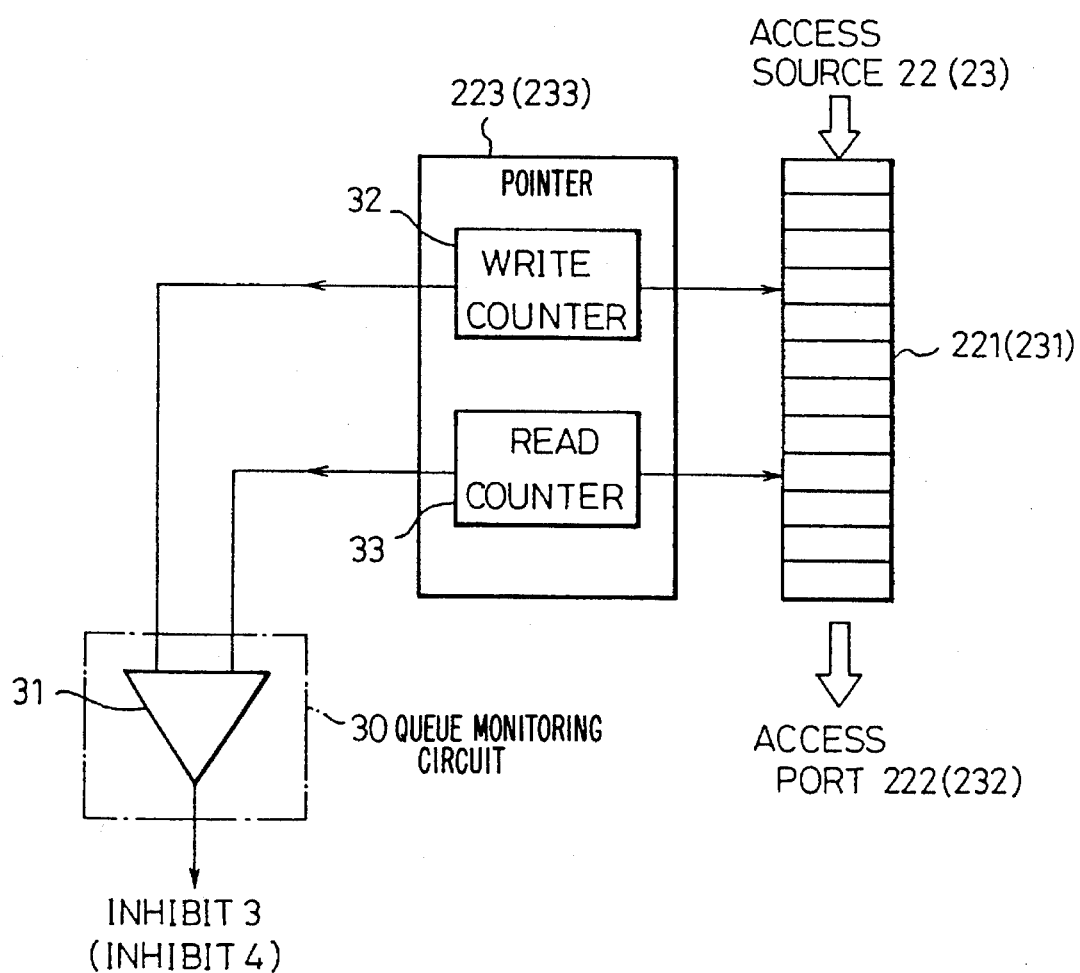
FIG. 12 is a circuit diagram of an example of the queue pointer monitoring circuit show in FIG. 10.

FIG. 12 is a circuit diagram of an example of the queue pointer monitoring circuit shown in FIG. 10. The queue pointer monitoring circuit 30 is comprised of a subtraction circuit 31 receiving a first output and a second output from a write counter 32 and a read counter 33, respectively, which two counters 32, 33 form the aforesaid queue pointers 223 (233). The subtraction circuit 31 produces the inhibit signal INHIBIT 3 (INHIBIT 4) every time the resultant subtraction value reaches the predetermined upper level, i.e., a threshold level given in advance to the subtraction circuit 31.

Figure 13:
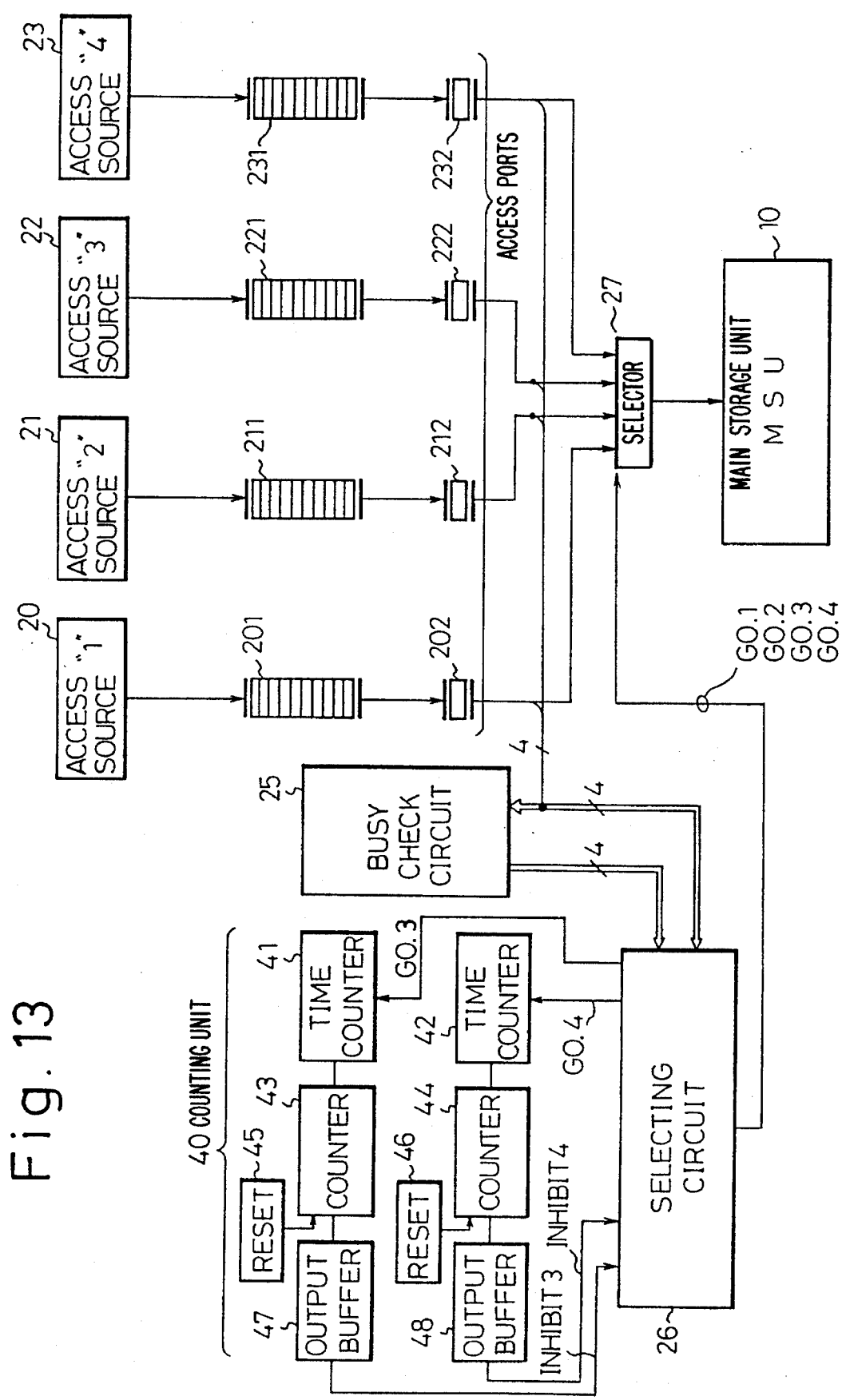
FIG. 13 is a block diagram illustrating a data processing system according to a third embodiment of the present invention.

FIG. 13 illustrates a data processing system according to a third embodiment of the present invention. The point of the third embodiment is that the aforesaid conflict state can be found by watching a number of cases in each of which the large throughput access source has to wait for a relatively long time to start its consecutive block access.

In the third embodiment, the detecting unit is comprised of a busy check circuit 25 similar to the first and second embodiment, and a counting unit 40.

As mentioned previously, the busy check circuit 25 is operative to check a busy state for each bank in the main storage unit 10. The third embodiment features the counting unit 40 which is comprised of a first counting circuit 41 (42) and a second counting circuit 43 (44). The first counting circuit 41 (42) measures a time interval between each of two consecutive timings at each of which the access request is issued from the access source "3" ("4") having the large throughput and produces a time-out signal every time the time interval exceeds a predetermined upper level. The second counting circuit 43 (44) counts a number of time-out signals, given from the first counting circuit 41 (42) per unit of time and produces an inhibit signal INHIBIT 3 (INHIBIT 4) when a number of the time-out signals exceeds a predetermined upper level.

Thus the selecting unit, i.e., the selecting circuit 26, is operated according to both the output from the counting unit 40, especially the second counting circuit 43 (44), and the output from the busy check circuit 25.

As in the first and second embodiments, the busy check circuit 26 receives signals given from the access ports 202, 212, 222 and 232 provided for respective access sources "1" through "4". Each of these signals from the access ports contain at least bank address information and identification information allotted to each said access source.

Thus the busy check circuit 25, and the counting unit 40 produces the busy signal, if any, and inhibit signal (INHIBIT), if any, respectively, which busy and inhibit signals are supplied to the selecting circuit 26.

The selecting unit, i.e., the selecting circuit 26 is substantially the same in a construction as that shown in FIG. 11.

The selecting circuit 26, i.e., logic gates (AND gates) should cooperate with the aforesaid timer means, as explained with reference to FIG. 7.

The busy check circuit 25 can be comprised of the aforesaid holding circuits (refer to flip flops 101 shown in FIG. 8). The function of the holding circuits has already been explained with reference to the related FIG. 8.

The first counting circuit 41 (42) measures the time interval by receiving subsequent GO signals GO. 3 (GO. 4), each of which is output from the selecting unit, i.e., the selecting circuit 26, for starting access to the main storage unit 10 in response to the access request issued by the access source "3" ("4") having large throughput.

The second counting circuit 43 (44) is provided with a reset timer 45 (46) which periodically clears the contents of the second counting circuit 43 (44) at constant intervals. The constant interval is determined to be not shorter than several times a delay time plus the bank busy time, i.e., one block access time (refer to $\gamma$ in FIG. 2A), which delay time is a minimum time required for removing the conflict (refer to $\alpha$ in FIG. 2A). In FIG. 13, reference numerals 47 and 48 represent output buffers to connect with the logic gates in the selecting circuit 26.

As explained above in detail, the present invention can prevent the data reduction in throughput of a processing system, even if a conflict is expected to occur between a small throughput access source and a large throughput access source by removing the conflict and giving priority to the large throughput access source for accessing the main storage unit.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

We claim:

1. A data processing system including a main storage unit and access sources for issuing access requests to access the main storage unit in a consecutive block access mode in which a plurality of blocks in the main storage unit are sequentially accessed, each block being a memory area specified by consecutive addresses, said data processing system comprising:

detecting means for generating a conflict signal indicating a conflict slats between a first consecutive block access request requested by one of the access sources having a relatively small throughput and a second consecutive block access request requested by one of the access sources having a relatively large throughput, said detecting means generating the conflict signal only when a conflict is expected to occur; and selecting means, coupled to said detecting means, for stopping the first consecutive block access request issued from the one of the access sources having the relatively small throughput, based on the conflict signal, so that said selecting means gives priority for accessing the main storage unit to the one of the access sources having the relatively large throughput, the access source having the relatively small throughput and the access source having the relatively large throughput changing addresses accessed in the main storage unit in an identical direction of change.

2. The data processing system as set forth in claim 1, wherein the main storage unit includes a plurality of banks, wherein said detecting means comprises:

a busy check circuit, operatively connected to the access sources, for checking a busy state for each of the banks in the main storage unit and outputting a busy signal; and an access source check circuit, operatively connected to said access sources, for storing identification information identifying each of the access sources having the relatively small throughput and outputting the conflict signal, the identification information being checked every time one of the access sources having the relatively large throughput issues the second consecutive block access request, and wherein said selecting means is operated based on the conflict signal from said access source check circuit and the busy signal from said busy check circuit.

3. The data processing system as set forth in claim 2, wherein said data processing system further comprises access ports respectively coupled to each of the access sources, and wherein said busy check circuit and said access source check circuit receive request signals given from the access sources via said access ports, said access ports being located between the access sources and the main storage unit, each of the request signals from said access ports containing bank address information and the identification information.

4. The data processing system as set forth in claim 3, wherein:

said selecting means comprises logic gates corresponding to each of the access sources, the busy signal includes first and second busy signals, each of said logic gates corresponding to one of the access sources having the relatively large throughput receiving the first busy signal for the one of the access sources having the relatively large throughput, and producing a first selection signal based on the first busy signal, for starting access to the main storage unit, if the first busy signal indicates that no busy state exists, each of said logic gates corresponding to one of the access sources having the relatively small throughput receiving the second busy signal and the conflict signal for the one of the access sources having the relatively small throughput, and producing a second selection signal for starting access to the main storage unit, if the busy signal indicates that no busy state exists and the conflict signal indicates that no conflict state with one of the access sources having the relatively large throughput exists, and if at least one of the busy state and the conflict state are indicated by the busy and conflict signals, respectively, the second selection signal is inhibited.

5. The data processing system as set forth in claim 4, wherein said logic gates corresponding to one of the access sources having the relatively small throughput are provided with timer means for discontinuing the second selection signal for a predetermined time sufficient to remove the conflict state after reception of the conflict signal for the one of the access sources having the relatively small throughput.

6. The data processing system as set forth in claim 3, wherein said selecting means outputs selection signals, each of the selection signals corresponding to one of the access sources, and wherein said busy check circuit comprises a first holding circuit provided for the banks in the main storage unit, and when one of the selection signals for starting access to the main storage unit is issued from said selecting means, the busy signal corresponding to the one of the selection signals is held in said first holding circuit for a predetermined time after issuance of the one of the selection signals, the predetermined time being long enough to complete an access of the main storage unit by the one of the access sources.

7. The data processing system as set forth in claim 3, wherein said selecting means outputs selection signals, each of the selection signals corresponding to one of the access sources, and wherein said access source check circuit comprises a holding circuit provided for the banks in the main storage unit, and when one of the selection signals for starting access to the main storage unit is issued from said selecting means in response to the access request from one of the access sources having the relatively small throughput, identification information corresponding to the one of the access sources having the relatively small throughput is held in said holding circuit for a predetermined time after issuance of the one of the selection signals, the predetermined time being long enough to complete an access of the main storage unit by the one of the access sources having the relatively small throughput.

8. The data processing system as set forth in claim 1, wherein the main storage unit includes a plurality of banks, said data processing system further comprising:

queue buffers respectively coupled to each of the access sources and located between the access sources and the main storage unit; and at least one queue pointer, wherein said detecting means comprises:

a busy check circuit, operatively connected to the access sources, for checking a busy state for each of the banks in the main storage unit and outputting a busy signal indicative of the busy state; and a queue pointer monitoring circuit, operatively connected to the at least one queue pointer, for monitoring the queue pointer which temporarily stores the first consecutive block access request in one of the queue buffers, and for outputting an inhibit signal if an amount of the access requests accumulated in said queue buffer reaches a predetermined upper level, and wherein said selecting means is operated based on the inhibit signal from said queue pointer monitoring circuit and the busy signal from said busy check circuit.

9. The data processing system as set forth in claim 8, wherein said data processing system further comprises access ports respectively coupled to each of the access sources, and wherein said busy check circuit receives request signals given from the access sources via said access ports, said access ports being located between the access sources and the main storage unit, each of the request signals from said access ports containing at least bank address information and identification information identifying each of the access sources.

10. The data processing system as set forth in claim 9, wherein:

said selecting means comprises logic gates corresponding to each of the access sources, the busy signal includes first and second busy signals, each of said logic gates corresponding to each one of the access sources having the relatively large throughput receives the first busy signal for the one of the access sources having the relatively large throughput, and produces a first selection signal based on the first busy signal, for starting access to the main storage unit, if the first busy signal indicates that no busy state exists, each of the logic gates corresponding to one of the access sources having the relatively small throughput receives the second busy signal and the inhibit signal for the one of the access sources having the relatively small throughput, and produces a second selection signal for starting access to the main storage unit, if the busy signal indicates that no busy state exists and the inhibit signal indicates that no conflict state exists with the one of the access sources having the relatively large throughput, and if at least one of the busy state and the conflict state are indicated by the busy and inhibit signals, respectively, the second selection signal is inhibited.

11. The data processing system as set forth in claim 10, wherein said logic gates corresponding to one of the access sources having the relatively small throughput are provided with timer means for discontinuing the second selection signal for a predetermined time sufficient to remove the conflict state after reception of the inhibit signal for the one of the access sources having the relatively small throughput.

12. The data processing system as set forth in claim 9, wherein said selecting means outputs selection signals, each of the selection signals corresponding to one of the access sources, and wherein said busy check circuit comprises a holding circuit provided for the banks in the main storage unit, and when one of the selection signals for starting access to the main storage unit is issued from said selecting means, the busy signal corresponding to one of the selection signals is held in said holding circuit for a predetermined time after issuance of the one of the selection signals, the predetermined time being long enough to complete an access of the main storage unit by the one of the access sources.

13. The data processing system as set forth in claim 8, wherein said queue pointer comprises a write counter producing a first output and a read counter producing a second output, and wherein said queue pointer monitoring circuit comprises a subtraction circuit for receiving the first output and the second output from the write counter and the read counter, for subtracting the second output from the first output to generate a subtraction value, and for producing the inhibit signal every time the subtraction value reaches the predetermined upper level.

14. The data processing system as set forth in claim 1, wherein the main storage unit includes a plurality of banks, wherein said detecting means comprises:

a busy check circuit, operatively connected to the access sources, for checking a busy state for each of the banks in the main storage unit and outputting a busy signal indicating the busy state; and counting means including a first counting circuit and a second counting circuit, said first counting circuit measuring a time interval between two consecutive access requests issued from the access source having the relatively large throughput and producing a time-out signal every time the time interval exceeds a first predetermined upper level, and said second counting circuit counting a number of occurrences of the time-out signal from said first counting circuit per unit of time and producing an inhibit signal when the number of occurrences of the time-out signal exceeds a second predetermined upper level, and wherein said selecting means is operated based on the inhibit signal from said counting means and the busy signal from said busy check circuit.

15. The data processing system as set forth in claim 14, wherein said data processing system further comprises access ports respectively coupled to each of the access sources, and wherein said busy check circuit receives request signals given from the access sources via said access ports, said access ports being located between the access sources and the main storage unit, each of the request signals from said access ports containing at least bank address information and the identification information identifying each of the access sources.

16. The data processing system as set forth in claim 15, wherein:

said selecting means comprises logic gates corresponding to each of the access sources, the busy signal includes first and second busy signals, each of the logic gates corresponding to each one of the access sources having the relatively large throughput receives the first busy signal for the one of the access sources having the relatively large throughput, and produces a first selection signal based on the first busy signal, for starting access to the main storage unit, if the first busy signal indicates that no busy state exists, each of the logic gates corresponding to one of the access sources having the relatively small throughput receives at least the second busy signal and the inhibit signal for the one of the access sources having the relatively small throughput and produces a second selection signal for starting access to the main storage unit, if the busy signal indicates that no busy state exists and the inhibit signal indicates that no conflict state exists with the one of the access sources having the relatively large throughput, and if at least one of the busy state and the conflict state are indicated by the busy and inhibit signals, respectively, the second selection signal is inhibited.

17. The data processing system as set forth in claim 16, wherein said logic gates corresponding to one of the access sources having the relatively small throughput are provided with timer means for discontinuing the second selection signal for a predetermined time sufficient to remove the conflict state after reception of the inhibit signal for the one of the access sources having the relatively small throughput.

18. The data processing system as set forth in claim 15,
wherein said selecting means outputs selection signals, each of the selection signals corresponding to one of the access sources, and
wherein said busy check circuit comprises a holding circuit provided for the banks in the main storage unit, and when one of the selection signals for starting access to the main storage unit is issued from said selecting means, the busy signal corresponding to the one of the selection signals is held in said holding circuit for a predetermined time after issuance of the one of the selection signals, the predetermined time being long enough to complete an access of the main storage unit by the one of the access sources.

19. The data processing system as set forth in claim 14,
wherein said selecting means outputs selection signals, each of the selection signals corresponding to one of the access sources, and
wherein said first counting circuit measures the time interval by receiving the selection signals, each of which is output from said selecting means for starting access to the main storage unit in response to the second consecutive block access request.

20. The data processing system as set forth in claim 14, wherein said second counting circuit includes a reset timer for periodically clearing said second counting circuit at constant intervals.

21. The data processing system as set forth in claim 20, wherein one of the constant intervals is determined to be not shorter than several delay times, each delay time being a time necessary to remove the conflict, plus a bank busy time, the bank busy time being a time necessary to access a block.

22. The data processing system comprising:
main storage means for storing data in a plurality of blocks;
first and second access sources, coupled to said main storage means, for issuing first and second access requests, respectively, to sequentially access the blocks of said main storage unit, the first access source having a relatively small throughput and the second access source having a relatively large throughput, the first and second access sources sequentially changing the blocks of said main storage means accessed in an identical direction of change;
detection means, coupled to said first and second access sources, for detecting a conflict in the access requests between the first and second access sources based on the first and second access requests, only when the conflict is expected to occur; and
selection means, coupled to said detection means, said main storage means and said first and second access sources, for delaying the first access request of the first access source having the relatively small throughput when the conflict is detected by said detection means.

23. A method of resolving a conflict between consecutive block access requests to a main storage unit from a first access source having a relatively small throughput and a second access source having a relatively large throughput, said method comprising the steps of:
(a) receiving consecutive block access requests from the first and second access sources, the consecutive block access requests of the main storage unit changing blocks of the main storage unit accessed in an identical direction of change;
(b) detecting the conflict in the consecutive block access requests between the first and second access sources, only when the conflict is expected to occur; and
(c) delaying the access request of the first access source having the relatively small throughput when the conflict is detected in said step (b), to remove the conflict.

24. The method as set forth in claim 23, further comprising the steps of:
(d) supplying the access request of the second access source having the large throughput to the main storage unit; and
(e) supplying the access request of the first access source having the small throughput to the main storage after step (c) has delayed the access request of the first source for a predetermined time.

25. An apparatus for use with a main storage unit including banks of memory space, said apparatus comprising:
a first access source to access the main storage unit in consecutive blocks in a predetermined sequential direction with a first access rate, the first access source generating a first access request including a first bank address to access the main storage unit;
a second access source to access the main storage unit in consecutive blocks in the predetermined sequential direction with a second access rate less than the first access rate, the second access source generating a second access request including a second bank address to access the main storage unit;
a first queue buffer coupled to the first access source, to temporarily store the first access request;
a second queue buffer coupled to the second access source, to temporarily store the second access request;
a conflict detection circuit coupled to the first and second queue buffers, to generate first and second GO signals, based on the first and second bank addresses, the conflict detection circuit deactivating the second GO signal whenever the first and second access requests would otherwise access identical memory space simultaneously; and
a selection unit coupled between the first and second queue buffers, and the main storage unit, and coupled to the conflict detection circuit, to allow the first access request to pass to the main storage unit based on the first GO signal, and to allow the second access request to pass to the main storage unit based on the second GO signal.

26. An apparatus for use with a main storage unit including banks of memory space, said apparatus comprising:
a first access source to access the main storage unit in consecutive blocks in a predetermined sequential direction with a first access rate, the first access source generating a first access request including a first bank address to access the main storage unit and first identification information identifying the first access source;
a second access source to access the main storage unit in consecutive blocks in the predetermined sequential direction with a second access rate less than the first access rate, the second access source generating a second access request including a second bank address to access the main storage unit and second identification information identifying the second access source;

a first queue buffer coupled to the first access source, to temporarily store the first access request a second queue buffer coupled to the second access source, to temporarily store the second access request;

a conflict detection circuit coupled to the first and second queue buffers, to generate first and second GO signals, based on the first and second bank addresses, the conflict detection circuit deactivating the second GO signal if the first and second access requests would otherwise access identical memory space simultaneously and including a first decoder coupled to the first and second queue buffers, to generate a plurality of SET signals based on one of the first and second bank addresses, a first plurality of flip-flops coupled to receive respective SET signals of the plurality of SET signals at respective set inputs of said first plurality of flip-flops, a plurality of AND gates coupled to receive the respective SET signals and coupled to receive the second identification information, a second plurality of flip-flops coupled to receive respective outputs of the AND gates, at respective set terminals of said second plurality of flip-flops, a first selector gate coupled to outputs of the first plurality of flip-flops, to generate a first BUSY signal, based on the first identification information, a second selector gate coupled to the outputs of the first plurality of inputs, to generate a second BUSY signal, based on the second identification information, a third selector gate coupled to outputs of the second plurality of flip-flops, to generate a CONFLICT signal, based on the first identification information, a first AND gate coupled to receive a signal responsive to the first BUSY signal, to generate the first GO signal based on the first BUSY signal, and a second AND gate coupled to receive a signal responsive to the second BUSY signal and a signal responsive to the CONFLICT signal, to generate the second GO signal based on the signal responsive to the second BUSY signal and the signal responsive to the CONFLICT signal; and a selection unit coupled between the first and second queue buffers, and the main storage unit, and coupled to the conflict detection circuit, to allow the first access request to pass to the main storage unit based on the first GO signal, and to allow the second access request to pass to the main storage unit based on the second GO signal.

27. The apparatus as claimed in claim 26, wherein the conflict detection circuit further includes a shift register receiving the one of the first and second bank addresses, and a second decoder coupled to outputs of the shift register, to generate RESET signals provided to reset terminals of the first and second pluralities of flip-flops.

28. An apparatus for use with a main storage unit including banks of memory space, said apparatus comprising:

a first access source to access the main storage unit in consecutive blocks in a predetermined sequential direction with a first access rate, the first access source generating a first access request including a first bank address to access the main storage unit and first identification identifying the first access source information;

a second access source to access the main storage unit in consecutive blocks in the predetermined sequential direction with a second access rate less than the first access rate, the second access source generating a second access request including a second bank address to access the main storage unit and second identification information identifying the second access source;

a first queue buffer coupled to the first access source, to temporarily store the first access request;

a second queue buffer coupled to the second access source, to temporarily store the second access request;

a conflict detection circuit coupled to the first and second queue buffers, to generate first and second GO signals, based on the first and second bank addresses, the conflict detection circuit deactivating the second GO signal if the first and second access requests would otherwise access identical memory space simultaneously;

a selection unit coupled between the first and second queue buffers, and the main storage unit, and coupled to the conflict detection circuit, to allow the first access request to pass to the main storage unit based on the first GO signal, and to allow the second access request to pass to the main storage unit based on the second GO signal;

a queue pointer coupled to the first queue buffer, to generate a first signal indicative of a number of access requests including the first access request, input to the first queue buffer from the first access source, and to generate a second signal indicative of a number of access requests output from the first-queue buffer;

a queue pointer monitoring circuit coupled to the queue pointer, to generate an INHIBIT signal based on the first and second signals;

a first decoder coupled to the first and second queue buffers, to generate a plurality of SET signals based on one of the first and second bank addresses;

a plurality of flip-flops coupled to receive respective SET signals at respective inputs thereof;

a first selector gate coupled to outputs of the first plurality of flip-flops, to generate a first BUSY signal, based on the first identification information;

a second selector gate coupled to outputs of the first plurality of flip-flops, to generate a second BUSY signal, based on the second identification information;

a third selector gate coupled to the queue pointer monitoring circuit to generate the INHIBIT signal, based on the first identification information;

a first AND gate coupled to receive the first BUSY signal, to generate the first GO signal, based on the first BUSY signal; and a second AND gate coupled to receive the second BUSY signal and the INHIBIT signal, to generate the second GO signal, based on the second BUSY signal and the INHIBIT signal.

29. The apparatus as claimed in claim 28, wherein the conflict detection circuit further includes a shift register receiving the one of the first and second bank addresses, and a second decoder coupled to outputs of the shift register, to generate RESET signals provided to reset terminals of the plurality of flip-flops.

30. An apparatus for use with a main storage unit including banks of memory space, said apparatus comprising:

a first access source to access the main storage unit in consecutive blocks in a predetermined sequential direction with a first access rate, the first access source generating a first access request including a first bank address to access the main storage unit and first identification information identifying the first access source, wherein the;

a second access source to access the main storage unit in consecutive blocks in the predetermined sequential direction with a second access rate less than the first access rate, the second access source generating a second access request including a second bank address to access the main storage unit and second identification information identifying the second access source;

a first queue buffer coupled to the first access source, to temporarily store the first access request;

a second queue buffer coupled to the second access source, to temporarily store the second access request;

a conflict detection circuit coupled to the first and second queue buffers, to generate first and second GO signals, based on the first and second bank addresses, the conflict detection circuit including a first decoder coupled to the first and second queue buffers, to generate a plurality of SET signals based on one of the first and second bank addresses, a plurality of flip-flops coupled to receive respective SET signals at respective inputs thereof, a first selector gate coupled to outputs of the first plurality of flip-flops, to generate a first BUSY signal, based on the first identification information, a second selector gate coupled to outputs of the first plurality of flip-flops, to generate a second BUSY signal, based on the second identification information, a first AND gate coupled to receive a signal responsive to the first BUSY signal, to generate the first GO signal, based of the signal responsive to the first BUSY signal, and a second AND gate coupled to receive the second BUSY signal and an INHIBIT signal, to generate the second GO signal, based on the second BUSY signal and the INHIBIT signal, a first counter coupled to receive the first GO signal, to generate a timeout signal based on an elapse of time between consecutive activations of the first GO signal, and a second counter coupled to receive the timeout signal, to generate the INHIBIT signal based on a predetermined number of activations of the timeout signal; and a selection unit coupled between the first and second queue buffers, and the main storage unit, and coupled to the conflict detection circuit, to allow the first access request to pass to the main storage unit based on the first GO signal, and to allow the second access request to pass to the main storage unit based on the second GO signal.

31. The apparatus as claimed in claim 30, wherein the conflict detection circuit further includes a shift register receiving the one of the first and second bank addresses, and a second decoder coupled to outputs of the shift register, to generate RESET signals provided to reset terminals of the plurality of flip-flops.

\* \* \* \* \*

UNITED STATES PATENT AND TRADEMARK OFFICE
CERTIFICATE OF CORRECTION

PATENT NO. : 5,509,136

DATED : April 16, 1996

INVENTOR(S) : Korekata et al.

It is certified that error appears in the above-indentified patent and that said Letters Patent is hereby corrected as shown below:

Col. 1,   line 31, "is" should be deleted;

line 45, "both access of the" should be --both of the access--.

Col. 4,   line 2, "term" should be --period--;

line 18, "to" should be --too--.

Col. 5,   line 7, "whether conflict" should be --whether a conflict--.

Col. 8,   line 30, "usual" should be deleted.

Col. 10,  line 41, "data reduction in throughput of a" should be --reduction in throughput of a data--;

line 66, "slats" should be --states--.

Col. 17,  line 2, "request" should be --request;--.

Signed and Sealed this

Twenty-third Day of July, 1996

Attest:

BRUCE LEHMAN

Attesting Officer      Commissioner of Patents and Trademarks